United States Patent Office 3,806,466
Patented Apr. 23, 1974

3,806,466
CARBON MOLECULAR SIEVE CATALYST
Alfred James Bird, Hounslow, and Barry John Cooper, Leighton Buzzard, England, assignors to Johnson, Matthey & Co., Limited, London, England
No Drawing. Filed July 12, 1971, Ser. No. 161,868
Claims priority, application Great Britain, July 10, 1970, 33,667/70
Int. Cl. C01z 31/10; B01j 11/12
U.S. Cl. 252—422
6 Claims

ABSTRACT OF THE DISCLOSURE

A method of preparing a selective catalyst comprising depositing a catalytically active material in a porous support, polymerizing an alcohol to form a liquid polymer resin, coating the supported catalytically active material with a layer of the liquid resin, curing and carbonizing the resin coating in an inert atmosphere and, thereafter, subjecting the so-prepared catalyst to a poisoning treatment by a material having molecules too large to enter the pores of the so-prepared catalyst whereby any catalytically active material other than that in the pores in rendered inactive so as to retain the selective characteristic of the catalyst.

---

This invention relates to catalysts and, in particular to catalysts which are selective or resistant to poisoning or both.

By "catalysts which are selective" is meant catalysts having the property, in the presence of substances between which certain reactions may be catalyzed, of catalyzing one or more of the reactions in preference to, or to the exclusion of, the others. Throughout this specification, this property will be referred to as "selectivity" and catalysts having this property will be described as "selective catalysts."

One way in which a selective catalyst may be prepared is to deposit catalytically active material within the pores of a support material having molecular sieve properties so as to form catalytically active sites within the pores. By molecular sieve properties of a support material is meant that the pores of the support are sufficiently small to prevent molecules above a certain size from entering them. The pores thus deny access to the active sites within the pores to certain sized molecules but permit molecules which are smaller than the pores size to reach the sites. The physical structure of the support material thus dictates which molecules in a given reaction system may reach the catalytically active sites within the material and therefore, which molecules may be available to take part in chemical reactions at these sites. The physical structure of the support material thus confers selectivity on the catalyst. Similarly, the physical structure of the support may protect the catalyst material within the pores from large poison molecules which, if they could enter the pores, could reduce the activity of the catalyst to zero.

In our co-pending application (U.S. Ser. No. 97,043), filed Dec. 10, 1970, we describe the use of molecular sieve carbon (a material which is often described as "microporous carbon") for the preparation of selective catalysts in which catalytically active material is associated with molecular sieve carbon in such a manner that the said molecular sieve carbon will deny access to the catalytically active material to molecules above a certain size. We also describe in the said application, methods of making such catalysts.

We have now found that in the manufacture of selective catalysts in which catalytically active material is actually deposited within the pores of molecular sieve carbon, some of the said material will, in general, be deposited on the exterior surface of the carbon. Since, in this location, the catalytically active material will be readily accessible to reactant molecules, its existence on the surface of the molecular sieve carbon will tend to reduce the selectivity of the catalyst. This reduction in selectivity can be corrected, or at least reduced, by treating the catalyst so as wholly, or partially to "poison" the catalytically active material on the surface of the carbon, that is, to render it catalytically inactive, this process being carried out in such a way as not to affect the activity of the catalyst material within the pores of the molecular sieve carbon. Alternatively, of course, the catalyst may be treated so as wholly, or partially, to remove the catalytically active material from the surface of the carbon.

In general, catalytically active material on the surface of molecular sieve carbon may be rendered catalytically inactive, without affecting the activity of catalyst material within the pores of the carbon, by treating the carbon with a material which will poison the catalytically active material, the molecules of the poison material being too large to enter the pores of the molecular sieve carbon.

Accordingly, the present invention provides a method of preparing a selective catalyst comprising depositing a catalytically active material in a porous support, polymeirizing an alcohol to form a liquid polymer resin, coating the supported catalytically active material with a layer of the liquid resin, curing and carbonizing the resin coating in an inert atmosphere and, thereafter, subjecting the so-prepared catalyst to a poisoning treatment by a material having molecules too large to enter the pores of the so-prepared catalyst whereby any catalytically active material other than that in the pores is rendered inactive so as to retain the selective characteristic of the catalyst.

The invention also includes a method of preparing a selective catalyst comprising depositing a catalytically active material in a porous support, polymerizing an alcohol to form a liquid polymer resin, coating the supported catalytically active material with a layer of the liquid resin, curing and carbonizing the resin coating in an inert atmosphere and thereafter, coating the external surface of the porous and so treated catalyst support with a layer of support material whereby any catalytically active material present on the external surface of the prepared catalyst is protected against poisoning.

Conveniently, the porous support is a composite carbon molecular sieve prepared by coating activated charcoal with a liquid thermosetting polymer and carbonizing the product, evacuating said carbon molecular; sieve at a low pressure at temperatures between 250° and 400°, cooling said molecular sieve to room temperature, vaporizing a volatile salt and causing said vapor to condense on said cooled carbon molecular sieve.

A particularly effective way of "poisoning" catalytically active material deposited on the surface of molecular sieve carbon is to treat the said carbon with a sulphur-containing organic material whose molecules are sufficiently large to prevent them from entering the pores of the carbon.

For example, if a catalyst comprising catalytically active platinum deposited within the pores and also on the exterior surface of molecular sieve carbon (in which the diameters of the pores range from 5 A. to 8 A) is treated with 2-methyl-2-propane thiol (t. BuSH), the activity of the catalyst for the hydrogenation of 3,3'-dimethylbutane-1 is reduced virtually, to zero while its activity for the hydrogenation of propylene is scarcely affected. Triethylamine may also be used in place of 2-methyl-2 propane thiol.

EXAMPLE 1

When 0.83 gm. of a catalyst comprising molecular sieve carbon which had platinum deposited within its pores and also on its exterior surface was maintained at 150° C. in a stream of hydrogen gas, injections of $2.0 \times 10^{-4}$ mole of 3,3'-dimethylbutene-1 and propylene, respectively, at a reciprocal space velocity of 0.021 gm. min. cm.$^{-3}$ gave the product yields shown in the third column of Table 1. After "poisoning" the catalyst with $1.5 \times 10^{-6}$ mole, 2-methyl-2 propane thiol, the yields were as shown in the fourth column of the table. As will be seen, the yield of 3,3'-dimethylbutane from 3,3'-dimethylbutene-1 was virtually reduced to zero while the yield of propane from propylene was only slightly affected.

TABLE I

| Hydrocarbon injected | Hydrogenation product | Yield Before poisoning | Yield After poisoning |
| --- | --- | --- | --- |
| 3,3'-dimethylbutene-1 | 3,3'-dimethylbutane | $1.5 \times 10^{-4}$ mole | $0.02 \times 10^{-4}$ mole |
| Propylene | Propane | $2.0 \times 10^{-4}$ mole | $1.76 \times 10^{-4}$ mole |

For convenience of handling and use in, for example, a catalytic reactor, the selective catalyst described above comprising a catalytically active material deposited within the pores of molecular sieve carbon may be supported on any suitable material. Such material may be particulate and porous or non-porous, the particles being of any convenient size and shape. For example, the selective catalyst may be applied to activated charcoal granules, gamma- or alpha-alumina granules or pellets or to a ceramic honeycomb material (such as "Torvex") consisting of alpha-alumina optionally coated with a thin layer of gamma alumina. The selective catalyst may be applied to such support materials by coating them with a thin layer of a mixture of partially polymerized furfuryl alcohol and catalytically active material or a precursor thereof and then completing the polymerization and carbonization as described hereinafter in Example 3.

Similarly, catalysts may be prepared from the catalytically active material or supported catalytically active material respectively by coating it with a thin layer of partially polymerized furfuryl alcohol and then curing (completing the polymerization) and carbonization. The cured and carbonized coating of molecular sieve carbon then serves to protect the catalytically active material against poisoning and to render it selective, as described above. Catalysts such as 0.5 Pd on $Al_2O_3$ pellets, 1% Pd on charcoal granules or platinized Torvex may be readily treated in this way.

For certain applications it may be desirable to have the selective catalyst formed according to the invention prepared in certain physical forms such as films, fibers or blocks of sundry shapes and sizes. these forms may be made by suitable treatment of partially polymerized furfuryl alcohol containing the catalytically active material or a precursor thereof, the viscosity of the material being suitably controlled by controlling the degree of polymerization. For example, a liquid polymer material may be cast into a thin film or other desired shape and cured and carbonized in this form. Alternatively, it may be extruded into filaments and then cured and polymerized. It may also be cast into blocks, or cylinders or other desired shapes. Blocks formed from catalyst supported on granular non-molecular sieve material and coated with a layer of molecular sieve carbon may also be fabricated by filling a vessel with the catalyst (such as Pd on granular carbon), adding partially polymerized furfuryl alcohol and then curing and carbonizing the whole.

The main feature is to prevent the polymerization proceeding to the stage where the solid polymer is formed or to prepare the polymer in a mold.

It has been found that careful regulation of the rate of polymerization is necessary due to the fact that fast reaction causes gases or vapor to be evolved as a result of exothermic conditions, with bubbling taking place throughout the polymer. The rate of polymerization may be regulated by control of the initial acid concentration. It is also advisable to control the heating rate to subsequent curing and carbonization stages because too rapid heating may cause extensive cracking of the final product. It has been determined that a temperature rise not exceeding 10° C. per minute is advisable for the final carbonization stage. A typical preparation is described in the following example using platinum as the catalytically active medium but other metals as described in Example 3 may be substituted.

EXAMPLE 2

0.1 ml. of an aqueous solution of chloroplatinic acid were added to 10 ml. of furfuryl alcohol in (a) a flat dish of 10 cm. diameter, and (b) a cylindrical tube 2 cm. diameter and left to stand overnight at room temperature. The resulting products were a plastic film 2 mm. thick and a cylinder 2 cm. diameter by 3 cm. long. These were cut into assorted sized discs, cylinders and annuli. These were dried by heating overnight at 50° C. under nitrogen, cured at 100° C. and 200° C. for 4 hours at each temperature, and then carbonized at 650° C. for 4 hours, all under nitrogen. Extensive shrinkage of the artifacts was observed after carbonization, which should be taken into account when designing specific shapes.

Insead of using an acidic solution of a salt of the desired metal, a suitable salt of the metal may be dissolved in the furfuryl alcohol and the polymerization started subsequently by the addition of acid.

The poison resistance of catalysts prepared by methods of the invention was examined using various large poison molecules and the results are set out below, including the action of t. butane thiol presented in Table II, for comparison purposes.

TABLE II

Poison resistance of Pt/CMS

The hydrogenation of propylene and of 3-3 dimethyl butene-1 at 150° C., $2.00 \times 10^{-4}$ moles/pulse. Reciprocal space velocity, 0.021 g. min. cc.$^{-1}$.

| Catalyst | Mole $\times 10^4$ Propane produced | Mole $\times 10^4$ 2,2 dimethyl butane produced |
| --- | --- | --- |
| Before poisoning | 2.00 | 1.50 |
| Poisoned by: | | |
| 1. t. Butane thiol | 1.76 | 0.02 |
| 2. Diisopropyl sulphide | 1.68 | 0.02 |
| 3. Triethylamine | 1.73 | 0.01 |
| 4. Diisopropylamine | 1.59 | 0.01 |
| 5. Triethyl phosphine | 1.62 | 0.03 |

We may therefore generalize poisons that are effective in reducing external metal activity, but do not poison internal metal in the hydrogenation of olefins over Pt/CMS by stating the poison must be of a type $R_nX$. Thus $R_n$ (where $n=1-3$) is an aryl or alkyl grouping attached to an atom X containing lone pair electrons so that although X is a poisoning function by virtue of the lone pair electrons, which are capable of strongly coordinating with the metal, $R_n$ is large enough to prevent entry to pores.

With reference to the preparation of the carbon molecular sieve, a number of organic materials may be used instead of the furfuryl alcohol used in the methods described above. For example, it is known to use poly-divinyl benzene and phenol-formaldehyde resins as well as furfuryl alcohol as starting materials for carbon molecular sieves. Other suitable starting materials include polyvinyl chloride and polyvinylidene chloride.

For a fuller understanding of the applicability of the present invention, preparation of the catalyst will now be described. The following examples are taken from our co-pending U.S. application Ser. No. 97,043.

EXAMPLE 3

In this example, a method is described which has been used for preparing a selective catalyst in which the catalytically active material is deposited within the pores of amorphous molecular sieve carbon.

In general, the method comprises forming a dispersion of platinum in an aliphatic alcohol medium in the manner described in our British Pat. No. 1,147,563; polymerizing the alcohol and then curing and carbonizing the resultant polymeric resin in an inert atmosphere.

In more detail, the method used was as follows:

1.2 g. of platinum oxide was weighed into a vessel, and the vessel flushed with nitrogen for 15 min. 30 ml. of furfuryl alcohol and 7 ml. of formaldehyde solution were added under a stream of nitrogen and the mixture stirred and warmed to 40° C. A further 5 ml. of formaldehyde solution were added, and the mixture left for ½ hour during which time the platinum oxide was completely reduced to colloidal platinum. At this stage another 5 ml. of formaldehyde solution were added and the suspension heated to 90° C. for ½ hour, following which 0.15 ml. of orthophosphoric acid solution (1 vol. $H_3PO_4$ to 2 vol. $H_2O$) were added. The suspension was kept at 90° C. for another hour, during which time partial polymerization to a viscous liquid occurred. The polymer was cured at 110° C. for 16 hours and at 200° C. for 6 hours under nitrogen. After crushing to form particles which would pass through a 2 mm. mesh, the particles were carbonized at 640° C. for 4 hours under oxygen-free nitrogen.

The resulting catalyst contained 5.72% by weight of platinum. However, by varying the quantity of platinum oxide used to produce the dispersion the concentration of platinum may be varied at will, though practical limits in the catalyst would probably be in the range 0.1%–20% platinum by weight. Further, the same method may also be used for the preparation of selective catalysts containing alloys of platinum and rhodium, containing up to 50% rhodium.

EXAMPLE 4

In this example, a method is described for the preparation of a selective catalyst comprising a supported catalyst coated with a layer of molecular sieve carbon.

In general, the method comprises forming a liquid polymer resin by polymerizing an alcohol; covering the supported catalyst with the liquid resin; allowing excess resin to drain away and, thereafter, curing and carbonizing the resin coating.

In more detail, the method used was as follows:

A reactor was flushed for 15 mins. under nitrogen and a solution containing 30 ml. furfuryl alcohol and 7 ml. formaldehyde (40% HCHO in water) added and warmed to 40° C. 5 ml. of formaldehyde solution was then added and the solution stirred for ½ hour when a further 5 ml. of formaldehyde solution were added and the whole heated to 90° C. for 1½ hours. Next, 0.15 ml. of orthophosphoric acid solution (1 vol. $H_3PO_4$ to 2 vol. $H_2O$) was added and heating continued at 90° C. for 1 hour. The hot liqiud polymer was then poured over granules of a 2% Pt on charcoal catalyst which were then allowing to drain at 90° for 1 hour. The resin coating was then cured and the catalyst carbonized as described in Example 3.

The catalysts prepared in Examples 3 and 4 were found to be highly selective in hydrogenation reactions. Samples of the catalysts, for example, selectively hydrogenated linear olefinic molecules in a mixture of linear and branched chain olefins. The catalysts are also resistant to poisoning by large poison molecules such as molecules of sulphur compounds.

The results of these tests on the catalysts are summarized in Table III.

TABLE III.—THE HYDROGENATION OF LINEAR AND OF BRANCHED OLEFINS OVER CONVENTIONAL PLATINUM/CHARCOAL AND OVER PLATINUM/CARBON MOLECULAR SIEVES

| () $1.78 \times 10^{-4}$ moles/pulse at 25° C. Reciprocal space velocity $9.0 \times 10^{-3}$ g. min./cm.³ | | | (B) $2.00 \times 10^{-4}$ moles/pulse at 30° C. Reciprocal space velocity $4.0 \times 10^{-4}$ g. min./cm.³ | | |
|---|---|---|---|---|---|
| | Alkane produced (mole×10⁴) | | | Alkane produced (mole×10⁴) | |
| Olefin | Pt/CMS1 | 10% Pt/C | Olefin | Pt/CMS2 | 2% Pt/C |
| (a) Propylene | 0.165 | 1.49 | (b) Butene-1 | 0.22 | 1.77 |
| (b) Butene-1 | 0.06 | 1.28 | (c) Isobutene | 0.02 | 1.14 |
| (c) Isobutene | 0 | 1.32 | (e) 3,3-dimethylbutene-1 | 0.02 | 0.99 |
| (d) 3-methylbutene-1 | 0 | 1.25 | | | |
| Selectivity $\dfrac{a}{a+c}$ | 1.0 | 0.53 | Selectivity $\dfrac{b}{b+c}$ | 0.92 | 0.61 |
| Selectivity $\dfrac{b}{b+d}$ | 1.0 | 0.51 | Selectivity $\dfrac{b}{b+e}$ | 0.92 | 0.64 |

(a) Propylene: C—C=C
(b) Butene-1: C—C—C=C (c) Isobutene: 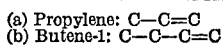

(d) 3-methylbutene-1: 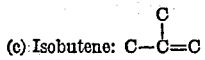

(e) 3,3-dimethylbutene-1: 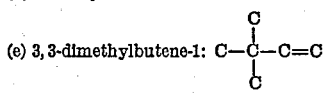

Other methods of preparation, such as adsorption of compounds containing catalytically active species from soluiton onto previously prepared molecular sieve carbon may also be employed. For example, such compounds as chloroplatinic acid, sodium chloropalladite, rhodium trichloride, ruthenium trichloride, may be adsorbed from an aqueous solution or any other solvent medium in which the salt is sufficiently soluble.

A further method of preparing carbon molecular sieve catalysts is to utilize an acidic solution of a salt of the desired catalytically active metal.

EXAMPLE 5

5 ml. of an aqueous solution of chloroplatinic acid (200 g./l. Pt) were added to 20 ml. of furfuryl alcohol and polymerization induced by slight warming. After the vigorous polymerization had ceased the solid polymer was removed from the reaction flask and dried by heating at 110° C. under nitrogen. The polymer was then cured at 200° C. for 16 hrs. and carbonized at 650° C. for 4 hrs., both under nitrogen.

Similar catalysts were prepared containing Fe, Co, Ni, Cu, Ru, Rh, Pd, Os and Ir as the catalytic metal by adding aqueous solutions of the chlorides acidified with hydrochloric acid to furfuryl alcohol and then treating in the same manner as for the platinum catalyst.

A further method of preparation that may be used is the deposition of active materials from the gas phase. For example, volatile salts such as anhydrous ferric chloride, aluminum chloride, copper chloride ($CuCl_2$) and tungsten chloride ($NCl_6$) may be sublimed onto the carbon.

EXAMPLE 6

Ferric chloride was successfully incorporated into a composite carbon molecular sieve (CCMS) by the following procedure.

The CCMS was first prepared by a method modified by coating an activated charcoal rather than a platinum/charcoal catalyst as in Example 4. The process of ferric chloride impregnation was as follows:

The CCMS and ferric chloride were placed in two zones of a tubular reactor heated by separate furnaces. The CCMS was then evacuated for 16 hrs. to a pressure less than $10^{-4}$ torr at temperatures between 250 and 400° C. The CCMS was cooled to room temperature and chloine gas admitted to the reactor when the ferric chloride was heated to 250–400° C. causing sublimation of the salt onto the cold CCMS. After heating the CCMS at 250–400° C. for up to 24 hrs. the reactor was cooled, excess chlorine pumped off, and the catalyst removed.

Apart from the carbon molecular sieve being selective due to the relative size of the molecules it is believed that they are to some degree "shape selective." There is evidence that with the carbon molecular sieves the pores are shaped somewhat similar to letter boxes and as a result the said sieves exhibit a form of selectivity which it may not be possible to achieve with other molecular sieves. For example, with a carbon molecular sieve it is possible to select between branched aliphatic molecules and aromatic molecules which latter have a flat planar shape and thus more readily enter the "letter box" pore than would branched aliphatic molecules.

What we claim is:

1. In a method for preparing a selective catalyst consisting essentially of a catalytically active material from the group consisting of metals and metal inorganic salts and a molecular sieve carbon produced by polymerizing furfuryl alcohol, curing the polymer and carbonizing said cured polymer in an inert atmosphere to form a molecular sieve carbon, wherein said molecular sieve carbon is unsupported or formed as a coating on a porous support, and wherein said catalytically active material is deposited within the pores of said molecular sieve carbon and some of said catalytically active material is deposited on the exterior surface of said molecular sieve carbon, the improvement which consists essentially of: subjecting the so-prepared catalyst to a poisoning treatment by organic alkyl and aryl compounds from the group consisting of amines, phosphines and sulphur containing compounds having molecules too large to enter the pores of the so-prepared catalyst whereby any catalytically active material other than that in the pores is rendered inactive so as to retain the selective characteristics of the catalyst.

2. A method according to claim 1 wherein the furfuryl alcohol is polymerized in the presence of orthophosphoric acid.

3. A method according to claim 1 wherein the porous support is activated charcoal.

4. A method according to claim 1 wherein the metal inorganic salt is ferric chloride.

5. A method according to claim 1 wherein the material used for the poisoning treatment comprises 2-methyl-2-propane thiol.

6. A method according to claim 1 wherein the catalytically active material is platinum.

References Cited

UNITED STATES PATENTS

| | | | |
|---|---|---|---|
| 3,446,865 | 5/1969 | Roth et al. | 252—447 |
| 2,459,907 | 1/1949 | Winslow et al. | 252—444 |
| 3,424,671 | 1/1969 | Kay | 208—DIG. 2 |

FOREIGN PATENTS

| | | | |
|---|---|---|---|
| 1,147,563 | 4/1969 | Great Britain | 252—430 |

OTHER REFERENCES

Journal of The Chemical Society, Section D, London, England, Chemical Communications, No. 7, Apr. 8, 1970, pp. 477–78, "The Preparation Of Selective Carbon Molecular Sieve Catalysts" by D. L. Trimm.

Chemical Abstracts, American Chemical Society, vol. 74, 5236 U; Jan. 11, 1971.

"Platinum Carbon Catalysts With Molecular Sieve Properties," by B. J. Cooper.

DANIEL E. WYMAN, Primary Examiner

P. E. KONOPKA, Assistant Examiner

U.S. Cl. X.R.

252—421, 423, 429 R, 430; 208—144; 260—683.9